United States Patent
Volftsun et al.

(10) Patent No.: US 7,596,131 B1
(45) Date of Patent: Sep. 29, 2009

(54) ADVANCED VOICE COMMUNICATION FEATURE TRANSPARENCY IN A TELECOMMUNICATIONS NETWORK

(75) Inventors: Lev Volftsun, Herndon, VA (US); Clay H. Neighbors, Reston, VA (US); Fred R. Rednor, Arlington, VA (US); Andrew H. West, High Wycombe (GB); Adrian R. Kingston, Gainsville, VA (US); Mikhail Rabinovitch, Herndon, VA (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 11/450,029

(22) Filed: Jun. 9, 2006

Related U.S. Application Data (63) Continuation of application No. 10/662,019, filed on Sep. 11, 2003, now Pat. No. 7,113,504, which is a continuation of application No. 09/106,449, filed on Jun. 30, 1998, now Pat. No. 6,650,632.

(51) Int. Cl.
*H04L 12/66* (2006.01)
(52) U.S. Cl. ...................... 370/352; 370/354
(58) Field of Classification Search ......... 370/351–358, 370/389, 373, 377, 384, 386
See application file for complete search history.

(56) References Cited

U.S. PATENT DOCUMENTS

| | | |
|---|---|---|
| 3,997,731 A | 12/1976 | Wilmont et al. |
| 4,979,207 A | 12/1990 | Baum et al. |
| 5,027,388 A | 6/1991 | Bradshaw et al. |
| 5,182,748 A | 1/1993 | Sakata et al. |
| 5,239,542 A | 8/1993 | Breidenstein et al. |
| RE34,536 E | 2/1994 | Frimmel, Jr. |
| 5,404,396 A | 4/1995 | Brennan |
| 5,414,762 A | 5/1995 | Flisik et al. |
| 5,420,916 A | 5/1995 | Sekiguchi |
| 5,426,694 A | 6/1995 | Hebert |
| 5,428,771 A | 6/1995 | Daniels et al. |

(Continued)

FOREIGN PATENT DOCUMENTS

WO     WO 95/31057     11/1995

(Continued)

OTHER PUBLICATIONS

Fuchan Joseph Lin et al., "A Methodology for Feature Interaction Detection in the AIN 0.1 Framwork," IEEE Transactions on Software Engineering, vol. 24, No. 10, Oct. 1998, pp. 797-817.

*Primary Examiner*—Brenda Pham
(74) *Attorney, Agent, or Firm*—Hickman Palermo Truong & Becker LLP (57) ABSTRACT

An auxiliary communication network is introduced into a virtual private network for passing signaling messages that present features not supported by the public, primary communication network portion of the virtual private network. Protocol converters are positioned within the virtual private network to intercept signaling messages, establish a connection through the auxiliary network, determine whether the intercepted messages present unsupported features, and, in which case, route corresponding feature requested through the auxiliary communication network. Preferably, the auxiliary network connection is established in a direction reverse to and in response to the primary network connection.

22 Claims, 6 Drawing Sheets

U.S. PATENT DOCUMENTS

| | | | |
|---|---|---|---|
| 5,517,563 A | 5/1996 | Norell | |
| 5,530,434 A | 6/1996 | Kanda | |
| 5,535,336 A | 7/1996 | Smith et al. | |
| 5,535,373 A | 7/1996 | Olnowich | |
| 5,537,679 A | 7/1996 | Crosbie et al. | |
| 5,539,787 A | 7/1996 | Nakano et al. | |
| 5,543,785 A | 8/1996 | Vatt et al. | |
| 5,546,450 A | 8/1996 | Suthard et al. | |
| 5,546,453 A | 8/1996 | Hebert | |
| 5,550,820 A | 8/1996 | Baran | |
| 5,557,652 A | 9/1996 | Jonsson | |
| 5,581,558 A | 12/1996 | Horney, II et al. | |
| 5,610,910 A | 3/1997 | Focsaneanu et al. | |
| 5,640,446 A | 6/1997 | Everett et al. | |
| 5,703,876 A | 12/1997 | Christie | |
| 5,778,189 A | 7/1998 | Kimura et al. | |
| 5,793,771 A | 8/1998 | Darland et al. | |
| 5,815,501 A | 9/1998 | Gaddis et al. | |
| 5,828,666 A | 10/1998 | Focsaneanu et al. | |
| 5,838,781 A | 11/1998 | Isaksson | |
| 5,848,070 A | 12/1998 | Durvaux et al. | |
| 5,862,339 A | 1/1999 | Bonnaure et al. | |
| 5,898,839 A | 4/1999 | Berteau | |
| 5,933,490 A | 8/1999 | White et al. | |
| 5,987,118 A | 11/1999 | Dickerman et al. | |
| 5,991,292 A | 11/1999 | Focsaneanu et al. | |
| 6,002,689 A | 12/1999 | Christie et al. | |
| 6,021,126 A | 2/2000 | White et al. | |
| 6,084,887 A | 7/2000 | Salisbury et al. | |
| 6,084,892 A | 7/2000 | Benash et al. | |
| 6,111,893 A | 8/2000 | Volftsun et al. | |
| 6,112,305 A | 8/2000 | Dancs et al. | |
| 6,125,127 A | 9/2000 | Smith, Jr. | |
| 6,141,345 A | 10/2000 | Goeddel et al. | |
| 6,151,390 A | 11/2000 | Volftsun et al. | |
| 6,175,565 B1 | 1/2001 | McKinnon et al. | |
| 6,192,045 B1 * | 2/2001 | Williams et al. | 370/352 |
| 6,253,249 B1 | 6/2001 | Belzile | |
| 6,269,094 B1 * | 7/2001 | Lecomte et al. | 370/352 |
| 6,292,480 B1 * | 9/2001 | May | 370/352 |
| 6,304,565 B1 * | 10/2001 | Ramamurthy | 370/352 |
| 6,324,280 B2 * | 11/2001 | Dunn et al. | 379/230 |
| 6,353,611 B1 * | 3/2002 | Norris et al. | 370/356 |
| 6,389,005 B1 | 5/2002 | Cruickshank | |
| 6,400,729 B1 | 6/2002 | Shimadoi et al. | |
| 6,584,094 B2 * | 6/2003 | Maroulis et al. | 370/352 |

FOREIGN PATENT DOCUMENTS

| | | |
|---|---|---|
| WO | WO 97/09807 | 3/1997 |
| WO | WO 97/09808 | 3/1997 |

* cited by examiner

ADVANCED VOICE COMMUNICATION FEATURE TRANSPARENCY IN A TELECOMMUNICATIONS NETWORK

CROSS REFERENCE TO RELATED APPLICATIONS

This application is a Continuation of and claims the benefit of priority under 35 U.S.C. §120 from co-pending U.S. patent application Ser. No. 10/662,019, filed Sep. 11, 2003, which is a Continuation of U.S. patent application Ser. No. 09/106,449, filed Jun. 30, 1998 and issued as U.S. Pat. No. 6,650,632 B1 on Nov. 18, 2003. This application is related to U.S. patent application Ser. No. 09/375,844, filed Aug. 16, 1999, which is a continuation of U.S. patent application Ser. No. 08/904,295, filed Jul. 31, 1997 and issued as U.S. Pat. No. 6,111,893; and is related to U.S. patent application Ser. No. 09/109,996, filed Jun. 30, 1998 and issued as U.S. Pat. No. 6,151,390, which is a continuation-in-part of U.S. patent application Ser. No. 08/904,295, filed Jul. 31, 1997 and issued as U.S. Pat. No. 6,111,893; all of which are incorporated by reference in their entirety for all purposes as if fully set forth herein.

TECHNOLOGY

The present invention relates to telecommunications. More particularly, embodiments of the present invention relate to signaling systems that communicate information about features of services and calls in virtual private networks.

BACKGROUND

Many corporations and other enterprises are installing private networks to interconnect their facilities to provide voice and data communications. Private networks typically include a number of private branch exchanges (PBXs) or other telephone switches that are linked together. Each PBX, which supports a private network or subnetwork of its own, is typically responsible for telecommunications services in a geographically restricted area, for example, at a particular building or campus occupied by the enterprise. In contrast to a public switched telephone network (PSTN), which is operated by a common carrier, a private network is generally characterized by access limits or restrictions, for example, by designating particular telephones or telephone numbers for internal communications only. As enterprises expand to include an increasing number of offices and sites, they need to link together the PBXs and private networks across wider geographical areas.

Figure 7A:
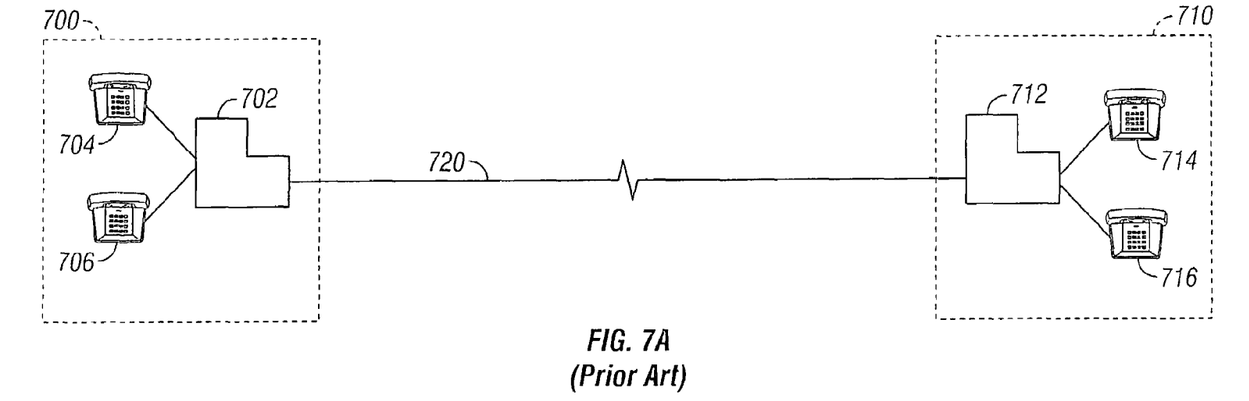
FIG. 7(a) is a diagram of a private network.

FIG. 7(a) depicts one way of linking private networks 700 and 710 together by installing a fixed, point-to-point private line 720 between the two private networks. For purposes of illustration, private network 700 includes a PBX 702 and two (2) telephones 704 and 706, and private network 710 also includes a PBX 712 and two (2) telephones 714 and 716. A fixed, point-to-point private line 720 is coupled between PBX 702 of private network 700 and PBX 712 of private network 710. Accordingly, a user of telephone 704 in private network 700 can call telephone 714 over fixed, point-to-point private line 720 in private network 710.

One drawback for an enterprise in interconnecting private networks at different sites with fixed, point-to-point private lines becomes apparent when the sites are widely separated. For example, to install a fixed, point-to-point private line beyond the boundaries of an office building or campus is often too expensive. When the sites are in different cities or different countries, the cost may become prohibitive. Accordingly, public telephone carriers offer "virtual private networks" to their customers.

Figure 7B:
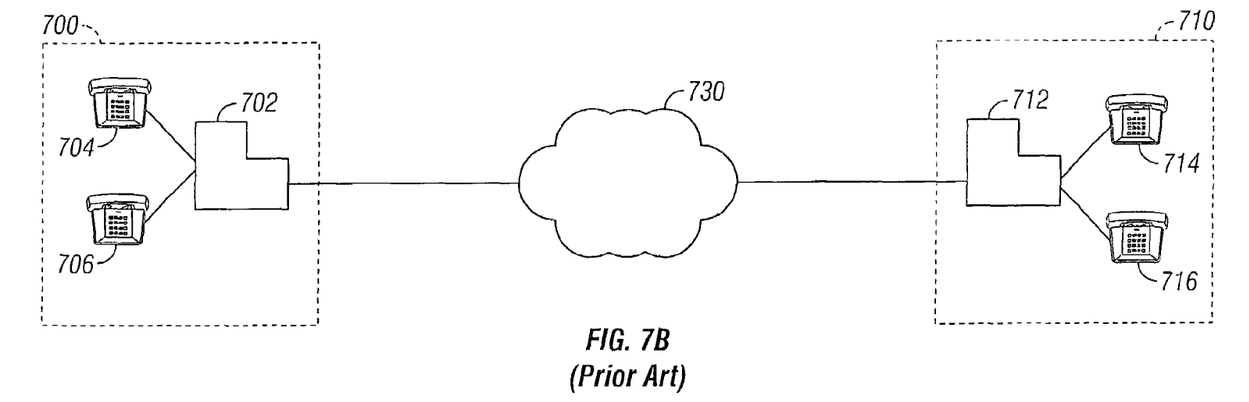
FIG. 7(b) is a diagram of a conventional private network that provides a virtual private network.

A virtual private network is a combination of public and private networks, in which the public portion of the virtual private network carries local and long distance communications between various private networks. In a virtual private network, as illustrated in FIG. 7(b), the customer uses the telephone carrier's public network 730 to interconnect its geographically separated private networks 700 and 710. The network dialing plans, routing schemes, and switches of the public network 730, however, are configured in such a manner that the customer's service appears to be carried over a private network connection. Such a configuration can actually involve the use of several interconnected networks, each of which use may employ a different signaling protocol.

One benefit of private networks over public networks is that they can provide features and services that are unavailable in public networks. A feature is a unit of functionality that is incrementally added to a network to provide an additional service to users of the network. Many PBXs that implement private networks employ various protocols to support a rich set of features. For example, DPNSS, a PBX protocol popular in the United Kingdom, offers Call-Back-When-Free, Three-Way-Calling, Call-Forwarding, and many other special features.

Many private networks, however, implement features that are generally not supported by the protocols used within common public networks and, hence, in common virtual private networks. Protocols or messages that include feature requests not supported by the public network are typically filtered out or otherwise lost at an access point in the public network, because the unsupported feature has no analogue in the signaling message structure of the public network. Although some protocols employed by public networks reserve some space in signaling messages for passing user-defined information, the available space is typically insufficient for directly supporting many features common in private networks. Consequently, calls placed from such a private network across the public network portion are usually limited to the lowest-common denominator, often Plain Old Telephone Service (POTS), thereby destroying the appearance of a wide area virtual private network.

Based on the foregoing, there is a clear need for mechanisms that permit use of advanced calling features in a virtual private network, even when the public telephone network that implements the virtual private network does not support, or have a protocol capable of supporting, features of the private network.

Further, there is a need for a method of transmitting signaling messages over a virtual private network that request advanced calling features not supported by a public network that implements the virtual private network.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A telecommunications method and device for feature transparency are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

These needs, and other needs that will become apparent from the following description, are addressed by the present invention, which comprises, in one aspect, an auxiliary communication network connection to transmit publicly non-supported features between sites in a virtual private network connected by a public communication network. Use of the auxiliary communication network enables messages to be passed between the virtual private networks sites without having to filter out or otherwise downgrade messages due to limitations in the protocols used by the public network. Consequently, users of the virtual private network gain feature transparency, which is the virtual appearance of a full-featured private network from end to end notwithstanding the lack of capabilities of the public communication network used for call establishment.

Since public communication networks often employ complicated and sophisticated routing techniques, there is also a need for a way to establish the auxiliary network connection without duplicating the routing logic of the public network. According to another aspect, the auxiliary connection is initiated through the auxiliary communication network from the destination site to the originating site, after the destination site in the virtual private network has received a connection request message from the originating site through the public network. Preferably, the auxiliary connection is established based on an identifier of the originating site passed within a user-defined space of the connection request message. Consequently, the auxiliary connection for handling features can be established regardless of how the original call is routed through the network.

Accordingly, one aspect of the invention relates to a call feature transmission apparatus for use with a first private network that is connected to a second private network by a communication network. The communication network employs a protocol incapable of supporting at least one feature supported by the first private network and the second private network. The apparatus comprises a first communications interface coupled between the first private network and the communication network so as to communicate information between the first private network and the communication network. The apparatus also includes a second communications interface coupled between the first private network and an auxiliary network so as to communicate messages in the protocol that use the at least one feature. A processor is coupled to the first communications interface, the second communications interface, and a memory. The memory contains one or more instructions which, when executed by the processor, cause the processor to intercept a message directed from the first private network to the second private network, determine whether the message uses the at least one feature, and in response, transmit the feature request to the second private network.

Another aspect of the invention involves a telecommunications network that includes a first private network and a second private network, in which both networks are capable of supporting a feature, and a first communication network, which employs a protocol incapable of supporting the feature. A first protocol converter is coupled to the first private network and the first communication network, and a second protocol converter is coupled to the second private network and the first communication network. The first and second protocol converters are telecommunications devices capable of converting between the different protocols at least those messages for establishing a connection. A second communication network is coupled to the first and second protocol converters for supporting the feature. Preferably, the first protocol converter is configured to establish a first connection from the first private network to the second private network through the first communication network. The second protocol converter is configured to establish a second connection from the second private network to the first private network through the second communication network in response to the first connection being established.

Still another aspect involves a method of transmitting a signaling message, requesting a feature, supported by the first and second private networks, from a first private network to a second private network in a virtual private network connected by a first communication network employing a protocol incapable of supporting the feature. Accordingly, a first connection is established through the first communication network between the first private network and the second private network. In response to establishing the first connection, a second connection is established between the first private network and the second private network through a second communication network. The feature is transmitted between the first private network and the second private network through the second communication network.

Yet another aspect relates to a telecommunications device including a computer system and a computer-readable medium bearing instructions for supporting feature transparency in a virtual private network. The virtual private network includes a first private network and a second private network connected by a first communication network, which employs a protocol incapable of supporting at least one feature supported by the first and second private networks. Accordingly, a signaling message is intercepted from the first private network for the second private network. If the signaling message includes a feature request not supported by the protocol of the first communication network, then the feature request is transmitted to the second private network through a second communication network.

Still other objects and advantages of the invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are intended as illustrative and not as restrictive.

Network Overview

Figure 1:
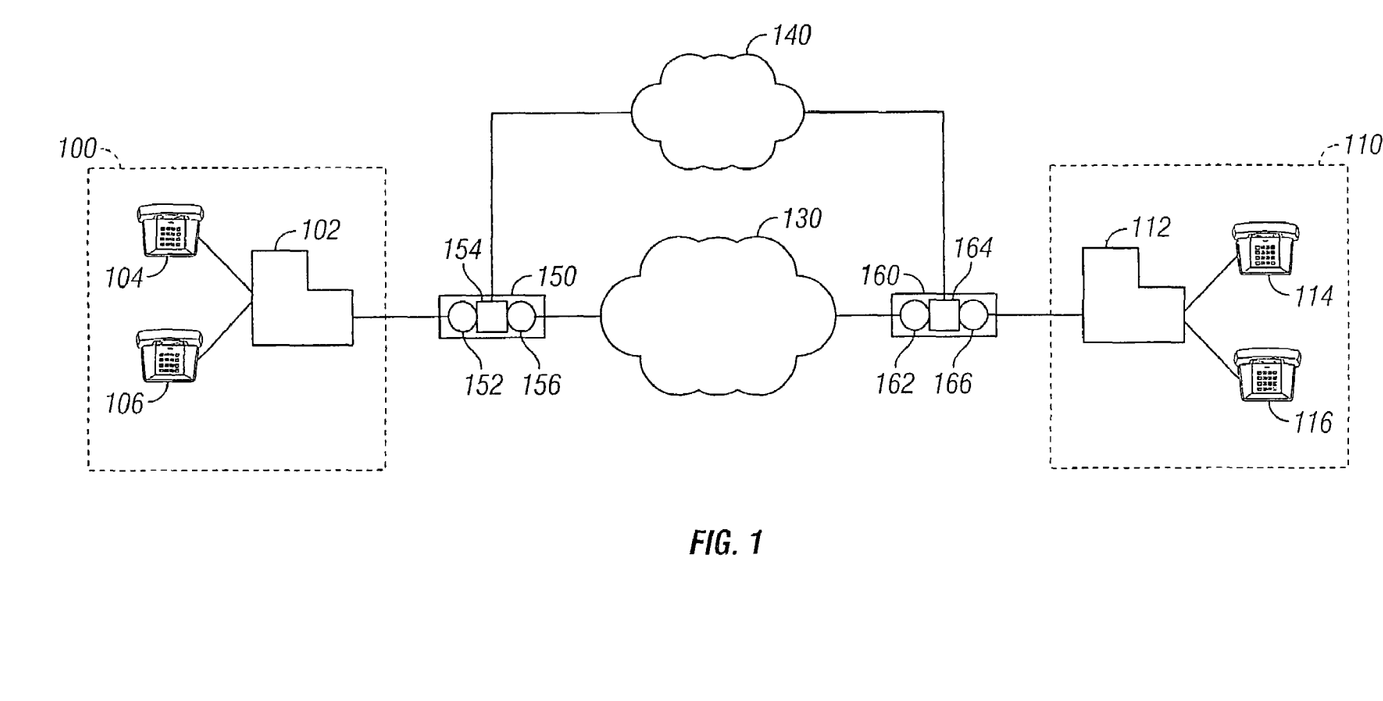
FIG. 1 is a diagram of a virtual private network capable of feature transparency.

FIG. 1 depicts a telecommunications network that implements feature transparency in a virtual private network in accordance with an embodiment of the present invention. The virtual private network includes at least two sites, private network 100 and private network 110, linked to one another by primary communication network 130. For purposes of illustration, private network 100 is depicted as including a PBX 102 and two telephones 104 and 106, and private network 110 is shown having a PBX 112 and two telephones 114 and 116. The number of telephones in a private network, however, may vary from private network to private network and is not limited in any way. Further, each private network may also include a plurality of interconnection PBXs, or may have, in place of a PBX, a telephone switch and a "smart phone" capable of generating messages in the protocol of the private network.

Primary communication network 130 is typically a public telephone network. Alternatively, primary communication network 130 may involve the use of several interconnected networks, each of which use may employ a different signaling protocol. For purposes of this discussion, the primary communication network 130 is assumed to support only Plain Old Telephone Service (POTS) and is therefore characterized as a "lowest common denominator" protocol. In this configuration, private networks 100 and 110 have implemented features that are not supported by the lowest common denominator protocol of the primary communication network 130.

The telecommunication network of FIG. 1 includes a first protocol converter 150 and a second protocol converter 160 logically interposed along a connection path between the primary communication network 130 and the private networks 100 and 110. The first protocol converter 150 and second protocol converter 160, respectively, intercept signaling messages to and from the private networks 100 and 110. In addition, the telecommunication network includes an auxiliary communication network 140 coupled to the protocol converters 150 and 160 for supporting feature transparency. The auxiliary communication network 140 is a logically separate network that may be integral to or physically overlaid on top of the primary communication network 130. The auxiliary communication network 140, however, employs a protocol for handling messages that can pass enough information to implement feature transparency. For example, one implementation of an auxiliary communication network 140 is a packet switched network employing TCP/IP, such as the global packet switched network known as the Internet.

The protocol converters 150, 160 are telecommunications devices capable of converting at least those messages for establishing a connection between different protocol. In one configuration, protocol converters 150, 160 intercept signaling messages to and from the private portions of the virtual private network, determine whether the messages invoke features not supported by the primary communication network 130, and route such messages through a connection over the auxiliary communication network 140. Provision of the auxiliary communication network 140, and positioning protocol converters 150 and 160 in the virtual private network to intercept signaling messages, enables such signaling messages to be routed over the appropriate communication network. Thus, signaling messages with features unsupported by the primary communication network 130 are routed over an auxiliary communication network 140 that can deliver the messages intact. As a result, users of the network gain the virtual appearance of a full-featured network from end to end of the connection.

For example, assume that private network 100 offers a particular call feature to its users, whereby a user of telephone 104, who has called telephone 114 that was busy, may inform PBX 112 to call back when telephone 114 is free. Since "call back when free" is a feature request that is not supported in POTS, this feature between private network 100 and private network 110 is not available in conventional virtual private networks. Accordingly, when the user of telephone 104 invokes the "call back when free" feature, for example by pressing a predefined sequence of keys, the protocol converter 150 intercepts the signaling message with the feature request. In response, the protocol converter routes the feature request from PBX 102 to protocol converter 160, not through primary communication network 130, which does not support the feature, but through auxiliary communication network 140, which does. Consequently, protocol converter 160 receives the feature request over the auxiliary communication network 140 and repackages the message for PBX 112.

In a preferred embodiment, protocol converter 150 comprises three abstract machine components that are instantiated for each call handled by the protocol converter. An originating call control (OCC) 152 converts signaling messages between the protocol of the originating side, e.g., DPNSS, and a non-protocol specific universal protocol. A universal call model (UCM) 154 handles calls in the converted universal protocol and arranges for messages to be routed ultimately to the primary communication network 130 or auxiliary communication network 140 as appropriate. A terminating call control (TCC) 156 converts signaling messages between the universal protocol and the protocol of the terminating side, e.g., ETSI. Likewise, protocol converter 160 includes an OCC 162, a UCM 164, and a TCC 166. This implementation of protocol converters 150 and 160 is described in more detail hereinafter and in the commonly assigned U.S. Pat. No. 6,111,893 entitled "Universal Protocol Conversion", the entire contents of which are incorporated by reference as if fully set forth herein.

Hardware Overview

The above-referenced patent document discloses structural and functional details of an embodiment of a protocol converter 150, 160. For purposes of context in this document, however, an overview of such structures and functions in an alternative embodiment is now provided.

Figure 2:
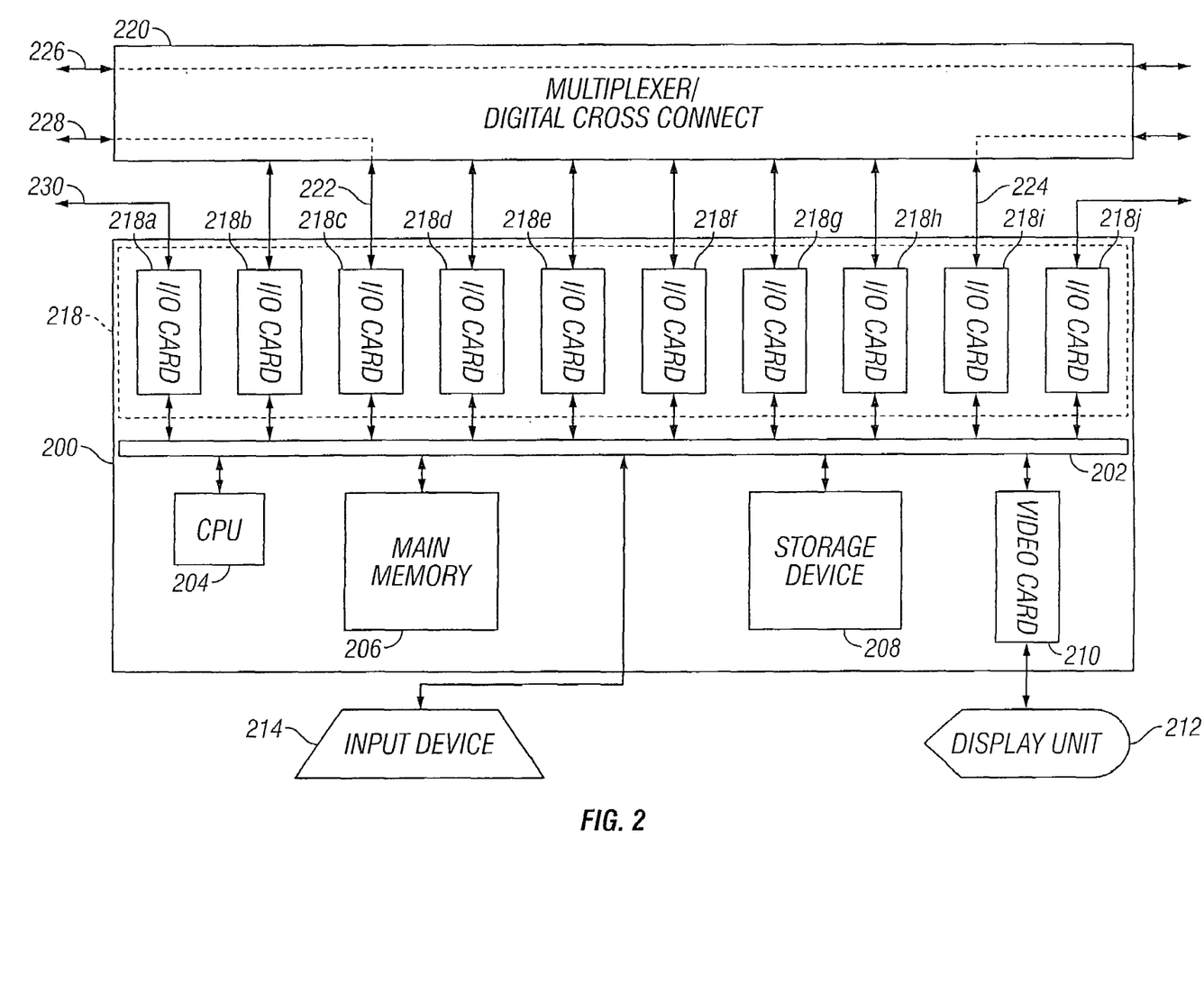
FIG. 2 is a block diagram of a protocol converter.

Referring to FIG. 2, the hardware components of a protocol converter 150, 160 include a computer system 200 and multiplexer/digital cross connect ("MUX") 220 coupled thereto. Computer system 200 includes a bus 202 or other communication mechanism for communicating information between internal components of the computer system 200. A central processing unit ("CPU") 204, comprising one or more processors, is coupled with bus 202 for processing information. Computer system 200 also includes a main memory 206 coupled to bus 202 for storing information and instructions to be executed by CPU 204. Main memory 206 typically includes a random access memory ("RAM") or other dynamic storage device, for storing temporary variables or other intermediate information during execution of instructions to be executed by CPU 204. Main memory 206 may also include a read only memory ("ROM") or other static storage device for storing static information and instructions for CPU 204. A storage device 208, such as a magnetic disk, magnetic tape, or optical disk, is provided and coupled to bus 202 for storing information and instructions.

Computer system 200 includes a video card 210 coupled to bus 202 for controlling display unit 212, such as a cathode ray tube (CRT), a liquid crystal display (LCD), a video monitor or other display device, to display information to a computer user. An input device 214 is coupled to bus 202 for communicating information and command selections from a user to CPU 204. Typically an input device includes a keyboard with alphanumeric, symbolic, and cursor direction keys for receiving input from a user in the form of commands and data entry and communicating the input to CPU 204. The input device typically includes a cursor control input device, such as a mouse or a trackball, integral with or separate from the keyboard, for controlling cursor movement on display unit 212, and communicating direction information and command selections to CPU 204. A cursor control input device typically has two degrees of freedom in two axes, a first axis (e.g., x) and a second axis (e.g., y), that allows the device to specify positions in a plane.

Computer system 200 also includes a communication interface 218 coupled to bus 202 and comprising a plurality of I/O cards 218a through 218j. Ten I/O cards 218a through 218j are shown in FIG. 2, but any number of I/O cards, modems, transceivers, or other I/O devices may be used. Communication interface 218 provides a two-way data communication coupling to MUX 220 that is connected to a network node or customer premises equipment including, for example, private network 100 or 110, and a primary communications network 130.

At least one of the I/O cards, for example I/O card 218a, is coupled to an auxiliary communication network 140 over a network channel 230. In one embodiment, auxiliary communication network 140 is the global, packet-switched TCP/IP network known as the Internet. Thus, communication interface 218 may include an integrated services digital network (ISDN) card, terminal adapter, or modem for providing a data communication connection to a corresponding type of telephone line. As another example, communication interface 218 may include a local area network (LAN) card to provide a data communication connection to a compatible LAN, for example an Ethernet network. Wireless links, such as infrared, for communication interface 218 may also be implemented. In any such implementation, communication interface 218 sends and receives electrical, electromagnetic or optical signals that carry digital or analog data streams representing various types of information, in the form of carrier waves transporting the information.

Accordingly, MUX 220 provides a network connection to computer system 200 including control channels 222 and 224. For simplification, only one bearer channel 226 and only one control channel 228 are illustrated in FIG. 2. However, digital facilities used in telecommunications networks that conform to an accredited standard generally contain a plurality of bearer channels and typically a single control channel, all of which are Time Division Multiplexed onto a single physical network link. Thus, MUX 220 is configured to receive the incoming circuits and groom off the control channels to be passed in an individual time slot of a digital circuit (for example, in ANSI T1 or ETSI E1 format) to communications interface 218 of computer system 200. Such grooming is represented in FIG. 2 as control channel 222 and 224 as a carrier of information to and from control channel 228. For an embodiment that supports Channel Associated Signaling (CAS), a single channel that transports both bearer traffic and control signals may be used.

This configuration enables the use of a protocol converter comprising a computer system 200 and MUX 220 for providing feature transparency in global, virtual private networks. For example, feature transparency functionality is provided by computer system 200 in response to CPU 204 executing one or more sequences of one or more instructions arranged in main memory 206. Such instructions may be written into main memory 206 from another computer-readable medium, such as storage device 208. Execution of the sequences of instructions contained in main memory 206 causes CPU 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to CPU 204 for execution. Such a medium may take many forms, including but not limited to non-volatile media, volatile media, and transmission media. Non-volatile media include, for example, optical or magnetic disks, such as storage device 208. Volatile media include dynamic memory, such as main memory 206. Transmission media include coaxial cables, copper wire and fiber optics, including the wires that constitute bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to CPU 204 for execution. For example, the instructions may initially be borne on a magnetic disk of a remote computer and downloaded to computer system 202. The remote computer can load the instructions into its dynamic memory and send the instructions over a telephone line using a modem. A communications interface 218 local to computer system 200 can receive the data on a telephone line or other network or telecommunication link and place the data on bus 202. Bus 202 carries the data to main memory 206, from which CPU 204 retrieves and executes the instructions. The instructions received by main memory 206 may optionally be stored on storage device 208 either before or after execution by CPU 204. The received instructions may be executed by CPU 204 as it is received, and/or stored in storage device 208, or other non-volatile storage for later execution. In this manner, computer system 200 may obtain application code in the form of a carrier wave.

Software Architecture

Figure 3:
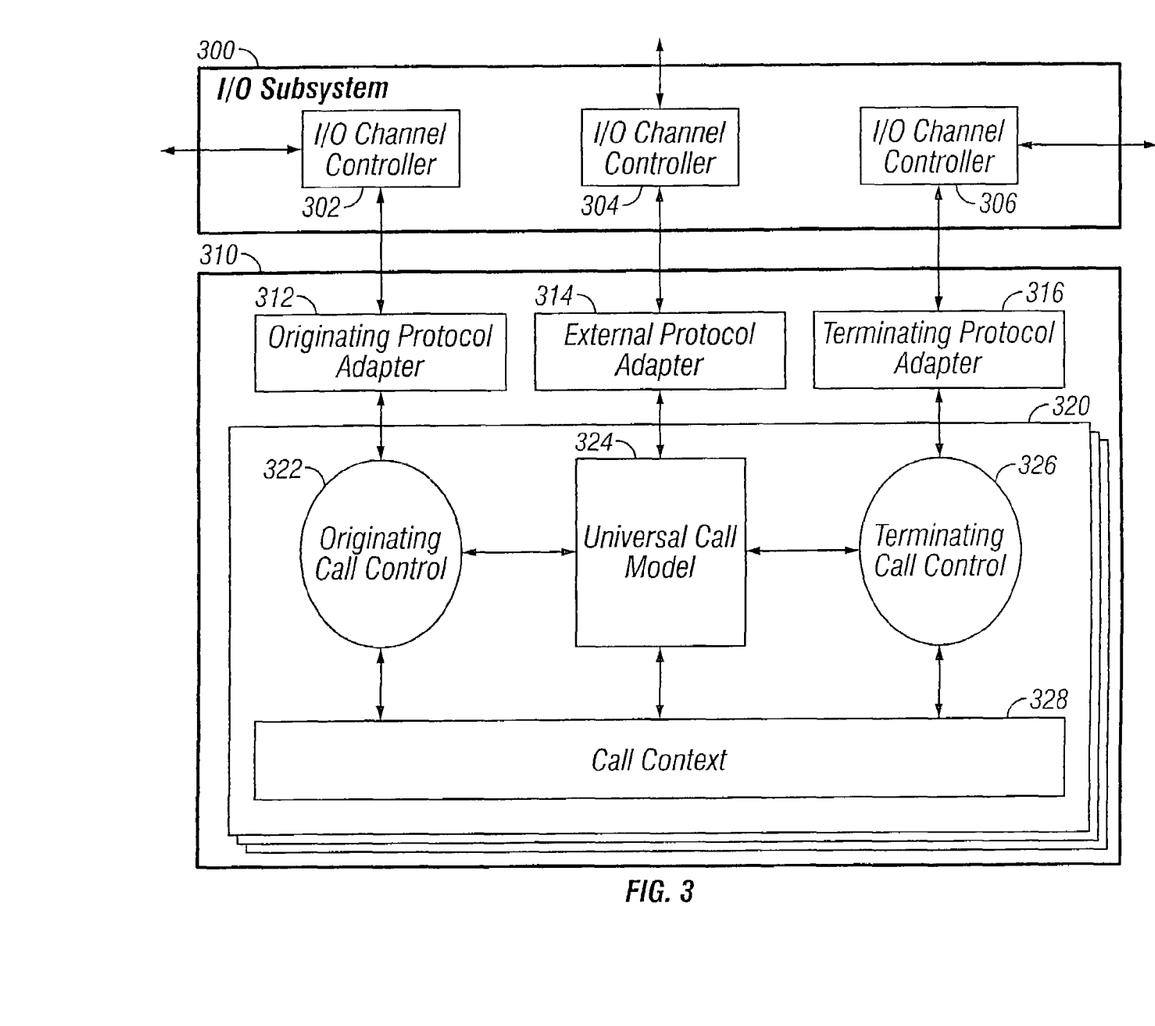
FIG. 3 is a block diagram of a software architecture of a protocol converter.

FIG. 3 schematically illustrates a software architecture relating to protocol conversion implemented on a computer system 200 of a protocol converter 150, 160. The software architecture includes an I/O subsystem 300 for handing OSI Layer 2 (data link layer) messages and a protocol conversion engine 310 for handling messages at OSI Layer 3 (network layer). I/O subsystem 300, containing I/O channel controllers 302, 304, and 306, is configured for handling incoming connection requests and other incoming messages. For example, I/O subsystem 300 can convert OSI Layer 2 frames and packets that transport the message into an OSI Layer 3 networking protocol data unit, which is a populated data structure that represents the contents of the messages. Specifically, I/O subsystem 300 may be configured to convert LAP-D (Link Access Protocol-D) frames or Ethernet frames into protocol data units. Moreover, the I/O subsystem 300 is also responsible for converting protocol data units generated by the protocol conversion engine 310 into frames and packets as appropriate for transmission in the telecommunications network. Each I/O channel controller 302, 304, and 306 is responsible for messages from a network channel handled by a corresponding I/O card of communications interface 218.

The protocol conversion engine 310 comprises a plurality of protocol adapters, implemented to support respective protocols or protocol families, and a number of call instances corresponding to each active call. A protocol adapter is a software module responsible for interfacing the protocol conversion engine 310 with the I/O subsystem 300. Specifically, a protocol adapter, when loaded and executed, is configured to connect with I/O subsystem 300 in order to route protocol-specific messages between an I/O channel and the appropriate call instance. Multiple instances of the same protocol adapter may be loaded and executed, each of which in association with a respective I/O channel. Although the protocol adapters are fundamentally bi-directional, it is convenient to refer to an originating protocol adapter 312, an external protocol adapter 314, and a terminating protocol adapter 316, based on their particular function during a call. Thus, a protocol adapter can be employed as an originating protocol adapter 312 for one call and as a terminating protocol adapter 316 for another call.

An originating protocol adapter 312 is capable of decoding an incoming message to determine with which call the message is associated and generate a call identifier to identify the associated call. A call identifier is a protocol-dependent value that serves to disambiguate messages for different calls from the same logical signaling channel. Every telecommunication protocol provides some means for matching up a message with an associated call; for example, using a specific call identifier embedded in the message (e.g., the Call Reference field using in ISDN_PRI) or the bearer channel identifier (e.g. with DPNSS and SS7/ISUP), but the present invention, which is capable of supporting many different protocols, is not limited to any particular means of matching up messages with the associated calls.

Accordingly, the originating protocol adapter 312 is configured to associate the call identifier with a corresponding call instance 320. The corresponding call instance 320 is responsible for processing the call, including converting, if necessary, the protocol from the originating side to be compatible with the protocol at the terminating side. If the originating protocol adapter 312 can locate the corresponding call instance 320 for the message, then the protocol adapter 312 routes the message to the call instance 320 for further processing as described hereinafter. On the other hand, the originating protocol adapter 312 may not be able to find the corresponding call instance 320, for example, because the message is for establishing a new call. In that case, the originating protocol adapter 312 is configured to instantiate a new call instance 320 corresponding to the particular call and route the message thereto for further processing.

When a new call instance 320 is instantiated, for example by originating protocol adapter 312, an appropriate channel for the call can be determined for the call statically (e.g. by a hard-coded table in a configuration file resident in storage device 208), dynamically (e.g. at run-time based on such factors as channel availability), or in a combination of static and dynamic techniques. The channel is associated with a particular terminating protocol adapter 316 and, hence, indicates the proper I/O channel controller 306 and protocol on the terminating side. The terminating protocol adapter 316 can route messages from associated call instances to the corresponding I/O channel controller 306, to a network node, and ultimately to the destination telephone. In accordance with the bi-directional nature of protocol adapters, a terminating protocol adapter 316 is configured also to receive protocol-specific messages from the terminating side of the network and pass them to the appropriate call instance. Likewise, an originating protocol adapter 312 can receive messages from a call instance 320 and pass them onto the corresponding I/O channel controller 302 for transmission to the appropriate destination.

An external protocol adapter 314 is a special kind of protocol adapter for interconnecting the protocol converter with an external system involved with the call. For example, the external protocol adapter 314 enables external systems to be involved in real-time call control such as Transaction Control Application Part (TCAP) communications with a C7 network Service Control Point (SCP). As another example, external protocol adapter 314 can employ a proprietary protocol for communicating with an external Fraud Control System involved in non-real-time control over the call. For implementing feature transparency, the external protocol adapter 314 is used for real-time communication with an external protocol adapter of another protocol converter at the other private network through an auxiliary communication network 140. Accordingly, the external protocol adapter 314 is responsible for connecting with the appropriate I/O channel controller 304 in the I/O subsystem 300 for sending and receiving messages with the auxiliary communication network 140 and routing the messages to and from the proper call instance 320. In addition, external protocol adapter 314 is capable of instantiating one or more new call instances based upon a message received from the external channel. In such an event, the other protocol adapters 312 and 316 are directed to initiate a call from a logical "originating" node to a terminating node. In this manner, features such as conference calling can be implemented.

A call instance 320 is instantiated by an originating protocol adapter 312 (or an external protocol adapter 314) for processing a call and performing protocol conversion, if necessary. A call instance 320 may be implemented in a variety of ways, including by a separate process, thread, or an interruptible flow of execution that can be resumed. When the call instance 320 is instantiated, memory for originating call control ("OCC") 322, universal call model ("UCM") 324, and terminating call control ("TCC") 326 is allocated and initialized. The call instance 320 also contains a call context 328, which is a region of memory for storing information about the current call. Some call-related information that persists beyond the duration of the call may be stored in a database in main memory 206 or storage device 208 to implement features such as Ring Back When Free.

Preferably, OCC 322, UCM 324, and TCC 326 are implemented as state machines by objects in an object-oriented programming language such as C++ or by other data structures in other programming languages. A state machine is an automaton that transitions from one of a finite number of states to another of those states in response to particular inputs. The output of a state machine occurs upon a state transition and is based on the destination state and typically also on the input and/or source state. The OCC 322, UCM 324, and TCC 326 state machines model a call from the perspective of the originating protocol, a universal protocol, and the terminating protocol, respectively.

OCC 322 models a call from the perspective of the originating protocol. More specifically, OCC 322 receives messages in the originating protocol from originating protocol adapter 312 and, in response, transitions from one state to another state, resulting in outputting a non-protocol specific (i.e., universal protocol specific) message to UCM 324. Conversely, OCC 322 receives non-protocol specific messages from UCM 324 and, by responsively transitioning from one state to another, outputs originating protocol specific messages to originating protocol adapter 312.

Likewise, TCC 326 models the call from the perspective of the terminating protocol. More specifically, TCC 326 receives non-protocol specific messages from UCM 324 and, by responsively transitioning from one state to another, outputs terminating protocol specific messages to terminating protocol adapter 312. Conversely, TCC 326 receives messages in the terminating protocol from terminating protocol adapter 316 and, in response, transitions from one state to another state, resulting in outputting a non-protocol specific (i.e., universal protocol specific) message to UCM 324.

UCM 324 manages the call according to a universal call model that uses the universal protocol produced by OCC 322 and TCC 326. For the most part, UCM 324 merely passes the universal protocol messages between the OCC 322 and TCC 326, thereby implementing a protocol conversion of the originating protocol into the terminating protocol via a universal protocol. UCM 324 may conditionally send messages to OCC 322 and TCC 326, however, based on the capabilities and requirements of the originating and terminating protocols, respectively. For example, some protocols require acknowledgement messages to be sent in response to a call setup message and others protocols do not. In this case, UCM 324 is configured to determine whether the originating protocol needs the acknowledgement message and cause one to be generated, if needed.

Since UCM 324 is positioned to intercept messages passed between the OCC 322 and the TCC 326, UCM 324 can perform kinds of message processing other than mere protocol conversion. In accordance with one embodiment of the present invention, UCM 324 is configured to implement feature transparency. Specifically, if the primary communication network 130 is unable to handle a particular feature even after protocol conversion, UCM 324 arranges for the feature to be communicated over the auxiliary communication network 140 using external I/O channel controller 304, as described in more detail hereinafter.

Establishing a Feature Transparent Call

Figure 4:
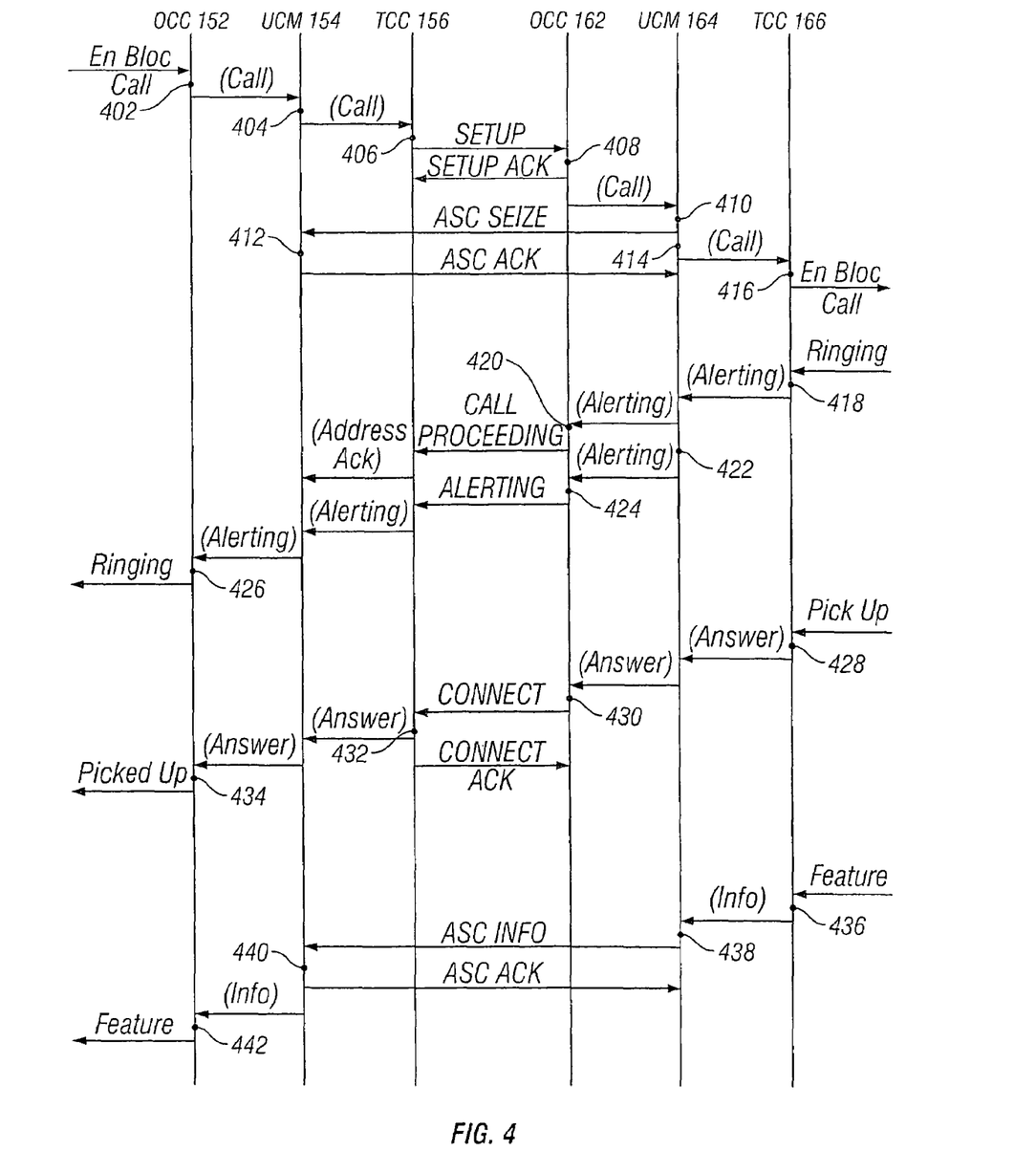
FIG. 4 is a call flow diagram illustrating an establishment of a call and a mid-call transfer of a message including a feature.

FIG. 4 is call flow diagram illustrating steps taken by protocol converters 150 and 160 in establishing a call between two private networks 100 and 110 through a primary communication network that is not configured for handling a feature supported by the private networks 100 and 110. The left side of FIG. 4 depicts the call flow of messages performed by OCC 152, UCM 154, and TCC 156, which are instantiated on the first protocol converter 150 of the originating side of the call. The right side of FIG. 4 depicts the call flow of messages performed by OCC 162, UCM 164, and TCC 166, which are instantiated on the second protocol converter 160 on the terminating side of the call.

When a user initiates a call on telephone 104, a connection request message is generated and transmitted from the telephone 104 through a connection that can comprise a PBX 102 or other telephone switch to the first protocol converter 150 on control channel 228. This connection request message is protocol-specific and varies from protocol to protocol. For example, in the DPNSS protocol, the connection request message is an ISRM_C message, but, as another example, the connection request message would be an Initial Address Message (IAM) in the Signaling System 7 (SS7) family of protocol. In yet another example, in the ISDN family of protocols such as ISDN_PRI, the connection request message is a Setup message. In most protocols, the connection request message contains a call identifier, an originating number, and a terminating number. The originating number may be the number of the originating telephone 104. The terminating number may be altered by primary communication network 130 in the course of determining the terminating telephone 114. Depending on the protocol and the action by the user, the connection request message may include a feature request. Accordingly, in this document, connection requests for calls that do not include a feature request are discussed first, and establishing a call with features is discussed thereafter.

Calls Initially Without Feature Requests

Although calls initially without a feature request do not require the immediate use of the auxiliary communication network 140, a feature request may arrive at any subsequent point in the call, which would require the establish of a connection over auxiliary communication network 140. Accordingly, a preferred embodiment establishes a connection over auxiliary communication network 140 even if the call does not initially present a feature. The connection over auxiliary communication network 140 is established from the protocol converter 160 of the destination private network 210 to the protocol converter 150 of the originating private network 200 in response to the establishment of a connection over primary communication network 130 from protocol converter 150 to protocol converter 160.

The non-feature connection request message is routed by MUX 220 through control channel 222 to I/O card 218c in communications interface 218. A corresponding I/O channel controller 302, executing as part of I/O subsystem 300 on computer system 200, unpacks the message into a protocol data unit and submits it to the corresponding, originating protocol adapter 312. Since this message is a connection request, the originating protocol adapter 312 cannot match the call identifier with an existing call instance. Consequently, the originating protocol adapter 312 instantiates a call instance containing OCC 152, UCM 154, and TCC 156 as specific embodiments of the OCC 322, UCM 324, and TCC 326 described above in connection with FIG. 3. Once the call instance is created, the protocol-specific connection request message is routed by the originating protocol adapter 312 to OCC 152.

OCC 152 is initially in an "idle" state. At point 402 in the call flow diagram, OCC 152 receives the protocol-specific connection request message immediately from originating protocol adapter 312 ultimately from telephone 104. In response, OCC 152 transitions from the idle state to a protocol-specific state generally indicative of waiting for a ring. For example, an OCC 152 implemented for the DPNSS protocol would enter a "wait for NAM" state. During the transition, OCC 152 performs various operations including the unpacking of the message into its component information, storing the information in the call context 328, and outputting of an internal, universal protocol "[Call]" message to UCM 154. In this example, the call context 328 includes, among other information, the originating telephone number, the destination telephone number, and a flag that indicates the presence of a feature. In this example, the feature flag is "false." Depending on the protocol, OCC 152 may perform other tasks such as sending back a NIM message to the originating telephone 104 in the DPNSS protocol.

At point 404, UCM 154 receives the universal protocol "[Call]" message, initializes the call identifier field in the call context 328, sets up an auxiliary channel, and stores an originating auxiliary channel identifier in the call context 328. The originating auxiliary channel identifier is value that indicates an address of protocol converter 150 in the auxiliary communication network 140. In one embodiment, the originating auxiliary channel identifier can be the actual address of protocol converter 150 in the auxiliary communication network 140, such as a four-octet TCP/IP address commonly used in the Internet. In another embodiment, the originating auxiliary channel identifier indirectly indicates the auxiliary network address of protocol converter 150, for example, by a protocol converter unit identifier. A protocol converter unit identifier is a network-wide unique value that identifies a specific protocol converter on the auxiliary communication network 140. Accordingly, each protocol converter in the network includes a translation table stored in storage device 208 that contains associations of a protocol converter unit identifier and the corresponding auxiliary network address for the so-identified protocol converter. After initializing the call identifier and the originating auxiliary channel identifier, UCM 154 send the universal protocol [Call] message to TCC 156.

At point 406, TCC 156 receives the universal protocol [Call] message from UCM 154 and builds a connection request message in the protocol appropriate for the primary communication network 130 from relevant data in the call context 328. For example, an appropriate message for the ETSI network is a "SETUP" message. In addition, TCC 156 appends a user-defined field to the connection request message that contains the call identifier, the originating auxiliary channel identifier, and the feature flag. Although the user field is generally too small to hold the whole feature string generated by the private network, the user field is typically large enough to hold this information. In this example of a non-featured call, the feature flag is "false."

After composing the connection request message in the protocol of the primary communication network 130, TCC 156 sends the composed message to the terminating protocol adapter 316, which submits the message to I/O channel controller 306 for transmission through primary communication network 130. The primary communication network 130 routes the connection request message based upon the destination number therein to reach the destination telephone 114 in private network 110. However, this message is received by the I/O channel controller (not shown) and the originating protocol adapter (not shown) on protocol converter 160, since protocol converter 160 is positioned to intercept and receive messages coming in from primary communication network 130 for private network 110.

The I/O channel controller and the originating protocol adapter on protocol converter process the received message and, in response, instantiate a call instance including OCC 162, UCM 164, and TCC 166 on protocol converter 160. At point 408, the connection request message is parsed by OCC 162 to obtain, among other parameters, the feature flag, the call identifier, and the originating auxiliary channel identifier, which are sent to UCM 164 in a universal protocol [Call] message or through the call context (not shown).

At point 410, UCM 164 uses the originating auxiliary channel identifier to generate an address of the protocol converter 150 within the auxiliary communication network 140. This address may be generated from probing a lookup table containing supported originating auxiliary channel identifiers and corresponding addresses in the auxiliary communication network 140. The specific format of the address depends on the particular embodiment of the auxiliary communication network 140. For example, if the auxiliary communication network 140 comprises the Internet, the address can be a four octet IP address or a symbolic address, represented by a string of characters, to be translated into the four octet IP address by a Domain Name Server (DNS).

When the address of a protocol converter in the auxiliary communication network 140 is generated, UCM 164 establishes a connection through auxiliary communication network 140. UCM 164 transmits an auxiliary connection request message, labeled in FIG. 4 as "ASC_SEIZE," via the external protocol adapter (not shown) to reach protocol converter 150. The auxiliary connection request message preferably includes information about the protocol converter 160 such as its address in the auxiliary communication network 140, its local call identifier, and the signaling protocol on the terminating side. This last parameter facilitates the interconnection of private networks employing different protocols into a larger virtual private network.

At point 412, UCM 154, which has been waiting for an establishment of a connection through the auxiliary communication network 140 from the terminating side, receives the auxiliary connection request message. UCM 154 stores the parameters transmitted in the auxiliary connection request message, such as the address of protocol converter 160 in the auxiliary communication network 140. UCM 154 sends an acknowledgement message labeled ASC_ACK back to UCM 164 through the auxiliary communication network 140. This acknowledgement message can be queued up as early as point 404. Meanwhile at point 414, since the call setup does not require a feature, UCM 164 concurrently transfers the ongoing call setup message [Call] to TCC 166 to avoid unnecessary network latencies.

When TCC 166 receives the universal protocol call setup message [Call] from UCM 164 at point 416, TCC 166 converts the universal protocol call setup message [Call] into the protocol-specific message appropriate for private network 110 based on information stored in the universal protocol call setup message [Call] and an instance of call context 328. Accordingly, the protocol-specific message, e.g. ISRM_C in the DPNSS protocol, is sent by TCC 166, through one of the I/O cards to the private network 110. Furthermore, TCC 166 enters a state that is waiting for a private-network-protocol-specific ringing message.

At point 418, TCC 166 receives the private-network-protocol-specific message, e.g. NAM in DPNSS, converts it to a universal protocol [Alerting] message, and sends it to UCM 164, which pass the universal protocol [Alerting] message to OCC 162. At point 420, OCC 162 converts the first universal protocol [Alerting] message it received into a public-network-protocol-specific call acknowledgement message, e.g. CALL_PROCEEDING in ETSI. As the terminating telephone 114 continues to ring, UCM 164 generates another [Alerting] message for OCC 162, which converts it to another public-network-protocol-specific alerting message, e.g. ALERTING in ETSI, to indicate that the terminating telephone 114 is ringing. OCC 162 transmits these messages through primary communication network 130 to TCC 156.

On the originating side, TCC 156 converts a public-network-protocol-specific call acknowledgement message, e.g. CALL_PROCEEDING, into a universal protocol "[AddressAck]" message for UCM 154, and converts the public-network-protocol-specific alerting message, e.g. ALERTING, into a universal protocol "[Alerting]" message. In response, UCM 154 passes the universal protocol [Alerting] message to OCC 152, which at point 426, converts the universal protocol [Alerting] message into an appropriate private-network-protocol-specific message such as NAM for DPNSS.

In this scenario, a person eventually picks up the ringing telephone 114, which results in a private-network-protocol-specific pick-up message such as CCM for DPNSS being received by TCC 166 at point 428. In response, TCC 166 converts the pick-up message into a universal protocol [Answer] message and transfers the universal protocol [Answer] message to UCM 164, which passes it onto OCC 162. At point 430, OCC converts the universal protocol [Answer] message into a public-network protocol connect message such as CONNECT in ETSI and transmits the converted message through primary communication network 130 to TCC 156. At point 432, TCC 156 generates a connection acknowledge message such as CONNECT_ACK in ETSI for OCC 162 and a universal protocol [Answer] message for UCM 154. At point 434, UCM 154 passes the universal protocol [Answer] message to OCC 152, which converts the universal protocol [Answer] message into a private-network-specific protocol message, such as CCM in DPNSS, indicating that terminating telephone 114 was picked up.

At this point, the call setup process is effectively completed and two network connections have been established. The first or primary network connection was established from TCC 156 of protocol converter 150 through primary communication network 130 to OCC 162 of protocol converter 160. The second or auxiliary network connection was established from UCM 164 of protocol converter 160 to UCM 154 of protocol converter 150 through auxiliary communication network 140 in response to the first network connection. By establishing the auxiliary network connection in a direction reverse to and in response to the primary network connection, the protocol converters can reliably determine the addresses of each other on the auxiliary communication network 140 without having to perform an analysis of the telephone numbers (A-number and B-number) involved in the call. This approach advantageously does not require a complete set of routing tables in each protocol converter that must exactly agree with the routing tables in the primary communication network 130. Consequently, costs associated with number analysis and maintaining and synchronizing the routing tables are avoided.

Handling Features at Mid-Call

As mentioned earlier, when a call is established between two private networks 100 and 110, two connections are set up. One connection passes through the primary communication network 130 for handling regular signaling messages, and a second connection is carried through auxiliary communication network 140 for handling features. When a signaling message that includes a feature request is received during mid-call, the protocol converters are ready to intercept and recognize such messages and route them through auxiliary communication network 140, thereby providing feature transparency.

Referring again to FIG. 4, TCC 166 at point 436 receives a private-network-protocol-specific signaling message that includes a feature request. For example, TCC 166 may receive an EEM message in the DPNSS protocol that contains a feature string. In response, TCC 166 copies the message elements of the private network protocol-specific featured message into the call context and sends a generic [Info] message to UCM 164. In response to the generic [Info] message at point 438, UCM 164 composes an information message, labeled ASC_INFO, based on data stored in the call context by TCC 166. UCM 164 transmits the information message through the auxiliary communication network 140 to reach UCM 154. Since the auxiliary communication network 140 may not be a reliable as the primary communication network 130, UCM 164 starts a timer for receipt of an auxiliary acknowledgement message from auxiliary communication network 140. As a result, the primary communication network 130 along with OCC 162 and TCC 156 have been by-passed, because that connection path is not capable of supporting the feature.

At point 440, UCM 154 receives the information message from UCM 164 through auxiliary communication network 140 and sends back an auxiliary acknowledgement message to UCM 164 through auxiliary communication network 140. UCM 154 also stores data received in the information in the call context and sends OCC 152 a generic [Info] message. In response at point 442, OCC 152 composes the featured message in the private-network-specific protocol based on information stored in the call context. In this example, OCC 152 reconstitutes the DPNSS EEM message with the feature string and sends it to private network 100.

Although an operation of handling featured messages has been explained in one direction, from the terminating private network 110 to the originating private network 100, it is to be understood that this operation is symmetric. Messages with feature requests can originate in private network 100, be transported over auxiliary communication network 140 by UCM 154 to UCM 164, and be converted back into a corresponding featured message for private network 110. Therefore, feature data can be communicated in either direction.

Handling Features at Call Establishment

Features can also be presented during call establishment from the terminating side or the originating side. "Terminating feature" requests are presented when a non-featured call setup message from the originating private network 100 is answered by the terminating private network 110 with a ringing or pick-up message. Examples of terminating features include Call Waiting and Call Forwarding. For "Originating features," the call setup message itself from the originating private network 100 presents a feature. Since both these scenarios present additional challenges, it is desirable for protocol converters implementing feature transparency to be able to handle either scenario.

Figure 5:
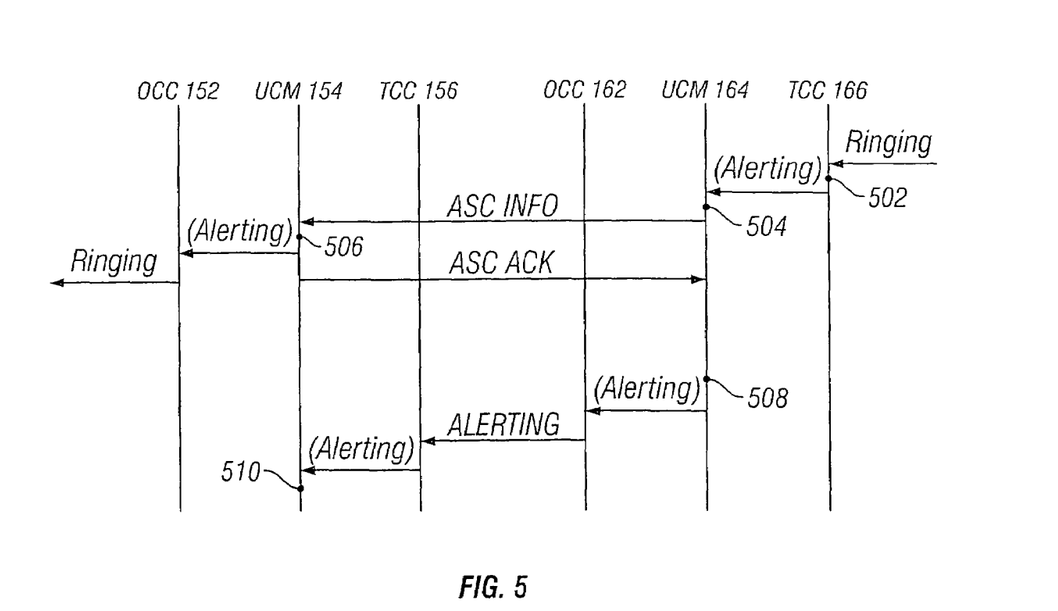
FIG. 5 is a call flow diagram illustrating a feature invocation from a terminating site during call establishment.

FIG. 5 is a call flow diagram depicting steps taken by protocol converters 150 and 160 for terminating features presented during call establishment. In this scenario, those messages must be sent over the primary communication network 130 for connection and timing reasons and be sent over auxiliary communication network 140 to communicate the feature request. Thus, the message must be sent twice, i.e. once over both the primary communication network 130 and the auxiliary communication network 140, but only one message must ultimately sent to the originating private network 100.

In accordance with one embodiment of the present invention, TCC 166 receives a private-network-protocol-specific ringing message with a feature request at point 502. For example, this message can be a NAM in the DPNSS protocol. TCC 166 extracts the feature request information from the message, stores the information in the call context, and generates a universal protocol [Alerting] message for UCM 164. At point 504, UCM 164 receives the universal protocol [Alerting] message and checks the call context to see if a feature was presented therewith. In this example, a feature was indeed presented with the DPNSS NAM message. In response, UCM 164 first composes an information message with the feature request information from the call context. UCM 164 transmits the information message over the auxiliary communication network 140 to UCM 154, and starts a timer for receiving an auxiliary acknowledgement message.

On the originating side at point 506, UCM 154 receives the information message with the feature request information from UCM 164 over the auxiliary communication network 140. In response, UCM 154 stores the feature request information in the call context and generates a universal protocol [Alerting] message for OCC 152. In addition, UCM 154 sets an "alerting sent" flag in the call context. When OCC 152 receives the universal protocol [Alerting] message, it returns an auxiliary acknowledgement message over auxiliary communication network 140. Moreover, OCC 152 examines the call context for any stored feature information appropriate for a private-network-protocol-specific ringing message, and uses that feature information to reconstitute the private-network-protocol-specific ringing message. In the example, the OCC 152 regenerates a DPNSS NAM message with the feature string. By these actions, the feature request is transparently transferred from private network 110 to private network 100.

When UCM 164 on the terminating protocol converter 160 receives the auxiliary acknowledgement message in the allotted time frame indicated by the time, UCM 164 generates a universal protocol [Alerting] message for OCC 162 at step 508. In response, OCC 162 converts the universal protocol [Alerting] message into a public-network-protocol-specific ringing message such as ALERTING in ETSI. This public-network-protocol-specific ringing message is received by TCC 156 and converted to a universal protocol [Alerting] message for UCM 154. These actions satisfy the connection and timing requirements for primary communication network 130.

When UCM 154 receives at point 510 the second universal protocol [Alerting] message from TCC 156 over the primary communication network 130, UCM 154 checks the "alerting sent" flag in the call context. Since this "alerting sent" flag was set at point 506, UCM 154 ignores the second universal protocol [Alerting] message and resets the "Alerting sent" flag. By ignoring the second message, UCM 154 advantageously prevents the generation of a superfluous, possibly disruptive, signaling message.

Although FIG. 5 illustrates only the operation of handling a private-network-protocol-specific ringing message that presents a feature, private-network-protocol-specific connection messages that present a feature, such as a DPNSS CCM with a facility string, are treated in a similar manner.

Figure 6:
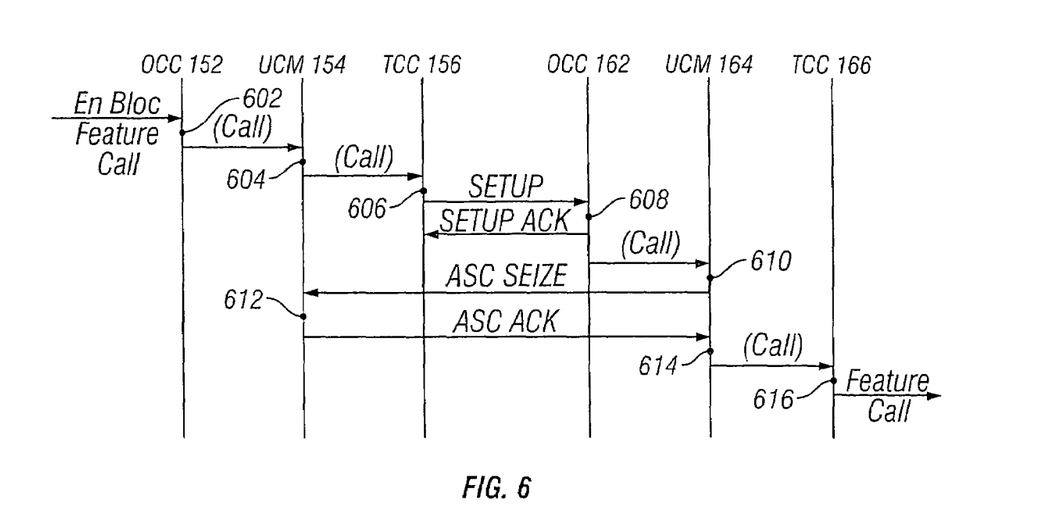
FIG. 6 is a call flow diagram illustrating a feature invocation in the call establishment.

FIG. 6 is a call flow diagram depicting steps taken by protocol converters 150 and 160 when a feature is initially presented in a call setup message from the originating private network 100. In this scenario, the feature needs to be transmitted to the terminating protocol converter 160 before the terminating protocol converter 160 formulates the call setup message for the terminating private network 110.

At point 602, OCC 152 receives a private-network-protocol-specific call setup message with a feature request. In response, OCC 152 extracts the feature request information from the message, stored that information in the call context, and sends a universal protocol [Call] message to UCM 154 that includes a set "feature" flag. At point 604, UCM 154 initializes the call identifier field in the call context, sets up an auxiliary channel, and stores an originating auxiliary channel identifier in the call context 328. In addition, the UCM 154 checks the "feature" flag. Since the "feature" flag is set, UCM 154 composes an auxiliary acknowledgement message based on the feature request information stored in the call context and queues the auxiliary acknowledgement message.

At point 606, TCC 156 receives the [Call] message from UCM 154 and builds a connection request message in the protocol appropriate for the primary communication network 140 from relevant data in the call context. For example, an appropriate message for the ETSI network is a "SETUP" message. In addition, TCC 156 appends a user-defined field to the connection request message that contains the call identifier, the originating auxiliary channel identifier, and the feature flag. In this example, the feature flag is "true." After composing the connection request message in the protocol of the primary communication network 130, TCC 156 sends the composed message to OCC 162 over primary communication network 130. At point 608, the public network protocol-specific connection request message is parsed by OCC 162 to obtain, among other parameters, the feature flag, the call identifier, and the originating auxiliary channel identifier. Values for these parameters are sent to UCM 164 in a universal protocol [Call] message or through the call context.

At point 610, UCM 164 uses the originating auxiliary channel identifier to generate an address of the protocol converter 150 within the auxiliary communication network 140 as described hereinabove with reference to point 410. When the address of protocol converter in the auxiliary communication network 140 is generated, UCM 164 establishes a connection through auxiliary communication network 140 and transmits an auxiliary connection request message over auxiliary communication network 140 to UCM 154. UCM 164 also checks the feature flag, and upon finding the feature flag set, waits for an auxiliary acknowledgement message to be received with the additional feature request information. In one embodiment, UCM 164 starts a one-second timer. The timer enables UCM 164 to avoid waiting indefinitely if the auxiliary communication network 140 or protocol converter 150 is down.

At point 612, UCM 154, which has been waiting for an establishment of a connection through the auxiliary communication network 140 from the terminating side, receives the auxiliary connection request message. UCM 154 stores the parameters transmitted in the auxiliary connection request message, such as the address of protocol converter 160 in the auxiliary communication network 140, and sends an acknowledgement message back to UCM 164 through the auxiliary communication network 140. This acknowledgement message had been queued at point 604.

UCM 164 receives the auxiliary acknowledgement message with the feature request information from UCM 154 at point 614, stores the feature request information in the call context, and generates a universal protocol call setup [Call] message with a set "feature" flag.

When TCC 166 receives the universal protocol call setup message [Call] from UCM 164 at point 616, TCC 166 converts the universal protocol call setup message [Call] into the protocol-specific message appropriate for private network 110 based on information stored in the universal protocol call setup message [Call] and the call context. In particular, TCC 166 examines the "feature" flag and constructs the private-network-protocol-specific call setup message containing the feature request information. Accordingly, the protocol-specific message, e.g. ISRM_C in the DPNSS protocol, is sent by TCC 166 to the private network 110. Finally, TCC 166 enters a state that is waiting for a private-network-protocol-specific ringing message.

At this point, the remainder of the call establish continues either as described above with reference to FIG. 4 or as described above for FIG. 5. The method of FIG. 4 is used if there are no additional features presented in the ringing or pick-up messages. The method of FIG. 5 is used when there are additional features presented in the ringing or pick-up messages. When the call is established, mid-call features are transferred between private network 100 and private network 110 as described with reference to FIG. 4.

Virtual Calls

Some protocols, e.g. DPNSS, utilize "virtual calls" for special features such as Remote Activation of Call Forwarding. A virtual call typically involves a request to read or modify data in a switch database at another location without requiring a physical connection for passing speech. Although virtual calls do not normally require the seizure of an actual bearer channel, in a preferred embodiment, an actual bearer channel over primary communication network 130 is briefly seized to locate the correct protocol converter on the terminating side. In this case, the terminating protocol converter immediately releases the call as soon as the address of the originating protocol converter in the auxiliary communication network 140 is obtained. Subsequently, the remaining call establishment messages, such as for ringing and pick-up, are transmitted over the auxiliary communication network 140.

Some features such as Call Back When Free include a series of inter-related calls between two nodes. For example, when a physical call between telephone 104 and 114 results in a busy condition, it is followed by a virtual call from the originating node to the terminating node requesting the Call Back When Free be activated at the terminating node on the requested line. At a later point, when line becomes free, a virtual call is made back to the original originating node, informing the protocol converter 150 that the line is free. At this point, a physical call is set up from the protocol converter 150 to the protocol converter 160, which upon success results in a call arrival notification (e.g. a ring) on the telephones 104 and 114.

In order to reduce occupancy of the bearer channels for the intermediate virtual calls, the originating auxiliary channel identifiers and the terminating auxiliary channel identifiers are stored in memory on both protocol converter 150 and protocol converter 160 after the bearer channel over primary communication network 130 was seized. Accordingly, communication over auxiliary communication network 140 can be initiated for the remainder of the virtual calls without recourse to the primary communication network 130 by using the stored originating auxiliary channel identifiers and the terminating auxiliary channel identifiers.

In the example of Call Back When Free, when the protocol converter 150 detects a busy condition in the initial call, the protocol converter 150 stores a temporary record containing the originating auxiliary channel identifier, the terminating auxiliary channel identifier, and the translated B number. This temporary record will have a short life span (typically 30 seconds) during which the Call Back When Free request must be received. If no such request is received within the allotted time frame, then the temporary record is automatically purged from the memory of the protocol converter 150. If, on the other hand, the feature request is timely, then the protocol converter 150 retrieves the temporary record and establishes a connection over auxiliary communication network 140 in the forward direction to protocol converter 160.

Customer Profiles

Robust support for feature transparency requires proper handling of calls upon the rare occasion that an auxiliary connection cannot be established over the auxiliary communication network 140. There is a variety of responses to the unavailability of the auxiliary connection, and the present invention is not limited to any particular response. For example, if the auxiliary connection is unavailable, the call can be released or the feature can simply be ignored without releasing the call. The desired behavior, however, in response to such an outage in the auxiliary communication network 140 is typically dependent on the particular feature being presented and the customer's requirements.

Accordingly, one embodiment provides a set of configurable "customer profile" tables, stored on each protocol converter, for specifying various feature interactions. These tables contain a list of features with corresponding, desired system behaviors indicated by an action code. When a feature is presented the protocol converters 150, 160 examines a local customer profile to determine how to handle the feature. The following TABLE 1 lists possible actions that one implementation may provide:

TABLE 1

| Action Code | Action |
| --- | --- |
| Feature_required | Feature requires the auxiliary connection, and, if unavailable, the call is released. |
| Feature_Preferred | Feature is transmitted over the auxiliary connection, and, if unavailable, the feature is ignored. |
| Feature_SendOverAsc | Feature is transmitted over the auxiliary connection, and, if unavailable, over the primary connection. |
| Feature_Remove | Feature is removed notwithstanding the availability of the auxiliary connection without notification to sending node. |
| Feature_Notify | Feature is removed from the call and sending node is notified. |
| Feature_Reject | Call is rejected and sending node is notified of unavailability. |
| Feature_NotRegistered | Call is rejected. |

Under certain circumstances, it is desirable to specify different behaviors for handling feature requests depending on the nature of the call. For example, a customer may decide to support certain features for intra-enterprise calls but disallows those features for extra-enterprise calls. Consequently, each protocol converters 150, 160 according to an embodiment store two customer profile tables, an "on-net" table for intra-enterprise calls and an "off-net" table for extra-enterprise calls. In this embodiment, the protocol converters 150, 160 are configured to furnish to each other a customer identifier indicative of the enterprise. When the customer identifiers match, the "on-net" customer profile table is used, and when the customer identifiers do not match, the "off-net" customer profile table is used.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. An apparatus, comprising:
    a communications interface;
    one or more processors coupled to said communications interface; and
    a memory coupled to said one or more processors and storing instructions which, when executed with said one or more processors, cause said one or more processors to allow an advanced voice communication feature in a virtual private network with program functions that comprise:
    determining, upon a call connected between a first and a second private network of said virtual private network through a first communication network, that a signaling message from said first private network invokes said advanced voice communication feature; and
    in response to the determining that a signaling message from said first private network invokes said advanced voice communication feature, establishing an auxiliary connection between said first and said second private networks through a second communication network wherein said auxiliary connection supports said advanced voice communication feature and the first communication network does not;
    wherein said advanced voice communication feature comprises at least one of a call-waiting function, a call-forwarding function, a three-way-calling function and a function relating to a custom calling feature.

2. The apparatus as recited in claim 1 wherein said virtual private network supports voice and data communications.

3. The apparatus as recited in claim 1 wherein said first communication network supports at least one of voice communications and data communications.

4. The apparatus as recited in claim 1 wherein said communications interface comprises:
   a first communications interface component that communicatively couples said first private network with said first communications network; and
   a second communications interface component that communicatively couples said first private network with said second communications network to support said auxiliary connection, wherein said signaling message from said first private network comprises a first protocol and wherein said program functions further comprise:
      converting said signaling message from said first protocol to a second signaling message in a second protocol, said second protocol for handling messages that pass sufficient information to implement said advanced voice communication feature; and
      transmitting, with said second communications interface, said second signaling message between said first private network and said second private network with said auxiliary connection through said second communication network.

5. The apparatus as recited in claim 1 wherein said auxiliary connection and said second communication network support voice communications and data communications.

6. The apparatus as recited in claim 1 wherein said first communication network comprises a public switched telephone network.

7. The apparatus as recited in claim 1 wherein said communications interface functions to receive said signaling message and wherein said program functions further comprise:
   intercepting said signaling message from at least one of said first and said second private networks wherein:
   upon intercepting said signaling message from said first private network, said first private network comprises a source of said call; and
   upon intercepting said signaling message from said second private network, said second private network comprises a destination of said call.

8. A method for allowing an advanced voice communication feature in a virtual private network, comprising:
   determining, upon a call connected between a first and a second private network of said virtual private network through a first communication network, that a signaling message from said first private network invokes said advanced voice communication feature; and
   in response to the determining that a signaling message from said first private network invokes said advanced voice communication feature, establishing an auxiliary connection between said first and said second private networks through a second communication network wherein said auxiliary connection supports said advanced voice communication feature and the first communication network does not;
   wherein said advanced voice communication feature comprises at least one of a call-waiting function, a call-forwarding function, a three-way-calling function and a function relating to a custom calling feature.

9. The method as recited in claim 8 wherein said virtual private network supports voice and data communications.

10. The method as recited in claim 8 wherein said first communication network supports at least one of voice communications and data communications.

11. The method as recited in claim 8 wherein said signaling message from said first private network comprises a first protocol, said method further comprising:
   converting said signaling message from said first protocol to a second signaling message in a second protocol, said second protocol for handling messages that pass sufficient information to implement said advanced voice communication feature; and
   transmitting said second signaling message between said first private network and said second private network with said auxiliary connection through said second communication network;
   wherein said advanced voice communication feature comprises at least one of a call-waiting function, a call-forwarding function, a three-way-calling function and a function relating to a custom calling feature.

12. The method as recited in claim 8 wherein said auxiliary connection and said second communication network support voice communications and data communications.

13. The method as recited in claim 8 wherein said first communication network comprises a public switched telephone network.

14. The method as recited in claim 8, further comprising:
   intercepting said signaling message from at least one of said first and said second private networks wherein:
   upon intercepting said signaling message from said first private network, said first private network comprises a source of said call; and
   upon intercepting said signaling message from said second private network, said second private network comprises a destination of said call.

15. A computer readable storage medium having encoded therewith computer readable code that comprises instructions, which when executed with a processor cause said processor to allow an advanced voice communication feature in a virtual private network with program functions that comprise:
   determining, upon a call connected between a first and a second private network of said virtual private network through a first communication network, that a signaling message from said first private network invokes said advanced voice communication feature; and
   in response to the determining that a signaling message from said first private network invokes said advanced voice communication feature, establishing an auxiliary connection between said first and said second private networks through a second communication network wherein said auxiliary connection supports said advanced voice communication feature and the first communication network does not;
   wherein said advanced voice communication feature comprises at least one of a call-waiting function, a call-forwarding function, a three-way-calling function and a function relating to a custom calling feature.

16. The computer readable storage medium as recited in claim 15 wherein said signaling message from said first private network comprises a first protocol, said program functions further comprising:
   converting said signaling message from said first protocol to a second signaling message in a second protocol, said second protocol for handling messages that pass sufficient information to implement said advanced voice communication feature; and transmitting said second signaling message between said first private network and said second private network with said auxiliary connection through said second communication network.

17. The computer readable storage medium as recited in claim 15, wherein said program functions further comprise:
intercepting said signaling message from at least one of said first and said second private networks wherein:
upon intercepting said signaling message from said first private network, said first private network comprises a source of said call; and
upon intercepting said signaling message from said second private network, said second private network comprises a destination of said call.

18. An apparatus for allowing an advanced voice communication feature in a virtual private network, comprising:
means for determining, upon a call connected between a first and a second private network of said virtual private network through a first communication network, that a signaling message from said first private network invokes said advanced voice communication feature; and
means for establishing an auxiliary connection between said first and said second private networks through a second communication network upon said connecting said call, wherein the establishing occurs in response to the determining that a signaling message from said first private network invokes said advanced voice communication feature, and further wherein said auxiliary connection supports said advanced voice communication feature and the first communication network does not;
wherein said advanced voice communication feature comprises at least one of a call-waiting function, a call-forwarding function, a three-way-calling function and a function relating to a custom calling feature.

19. The apparatus as recited in claim 18 wherein said signaling message from said first private network comprises a first protocol, said apparatus further comprising:
means for converting said signaling message from said first protocol to a second signaling message in a second protocol, said second protocol for handling messages that pass sufficient information to implement said advanced voice communication feature; and
means for transmitting said second signaling message between said first private network and said second private network with said auxiliary connection through said second communication network.

20. The apparatus as recited in claim 18, further comprising:
means for intercepting said signaling message from at least one of said first and said second private networks wherein:
upon intercepting said signaling message from said first private network, said first private network comprises a source of said call; and
upon intercepting said signaling message from said second private network, said second private network comprises a destination of said call.

21. A system that allows an advanced voice communication feature, comprising:
a virtual private network that comprises a first and a second private network, each of which support said advanced voice communication feature;
a first communication network that communicatively couples said first and said second private networks;
a second communication network that communicatively couples said first and said second private networks and supports said advanced voice communication feature wherein said advanced voice communication feature is unsupported with said first communications network; and
a protocol converter coupled to said first private network and comprising:
a first communications interface that communicatively couples said first private network and said first communications network;
a second communications interface that communicatively couples said first private network and said second communications network in a protocol that suffices to implement said advanced voice communications feature;
a processor coupled to said first and said second communications interfaces; and
a memory coupled to said processor and storing instruction code, which when executed with said processor, cause said processor to allow said advanced voice communication feature in said virtual private network with program functions that comprise:
determining, upon a call connected between said first and said second private networks through said first communication network, that a signaling message from said first private network invokes said advanced voice communication feature; and
in response to the determining that a signaling message from said first private network invokes said advanced voice communication feature, establishing an auxiliary connection between said first and said second private networks through a second communication network wherein said auxiliary connection supports said advanced voice communication feature and the first communication network does not;
wherein said advanced voice communication feature comprises at least one of a call-waiting function, a call-forwarding function, a three-way-calling function and a function relating to a custom calling feature.

22. The system as recited in claim 21 wherein said program functions further comprises:
intercepting said signaling message from at least one of said first and said second private networks wherein:
upon intercepting said signaling message from said first private network, said first private network comprises a source of said call; and
upon intercepting said signaling message from said second private network, said second private network comprises a destination of said call.

* * * * *